United States Patent [19]

Hopkins

[11] 4,289,047
[45] Sep. 15, 1981

[54] DIFFERENTIAL GEAR POSITIONING MEANS

[75] Inventor: Michael F. Hopkins, Aurora, Ill.

[73] Assignee: Caterpillar Tractor Co., Peoria, Ill.

[21] Appl. No.: 116,744

[22] PCT Filed: Nov. 13, 1979

[86] PCT No.: PCT/US79/01010

§ 371 Date: Nov. 13, 1979

§ 102(e) Date: Nov. 13, 1979

[87] PCT Pub. No.: WO81/01450

PCT Pub. Date: May 28, 1981

[51] Int. Cl.³ .................. F16H 1/40; F16H 1/38
[52] U.S. Cl. ........................ 74/713; 74/417; 74/424; 74/710
[58] Field of Search .......... 74/710, 713, 715, 694, 74/674, 606 R, 423, 417, 424, 711

[56] References Cited

U.S. PATENT DOCUMENTS

| | | | |
|---|---|---|---|
| 1,568,287 | 1/1926 | Melanowski | 74/694 |
| 1,984,179 | 12/1934 | Diack | 74/694 |
| 2,566,601 | 9/1951 | Cousins | 74/713 |
| 2,680,972 | 6/1954 | Tone | 74/713 |
| 2,771,791 | 11/1956 | Bachman | 74/713 |
| 2,774,253 | 12/1956 | Minard et al. | 74/713 |
| 2,865,219 | 12/1958 | Allen | 74/424 |
| 3,171,291 | 3/1965 | Barnes | 74/388 |
| 3,199,375 | 8/1965 | Rosen et al. | 74/713 |
| 3,247,739 | 4/1966 | Wuesthoff | 74/713 |
| 3,406,592 | 10/1968 | Von Kaler | 74/713 X |
| 3,495,479 | 2/1970 | Rass | 74/710 |
| 3,779,102 | 12/1973 | Pfarrwaller | 74/713 |
| 3,848,482 | 11/1974 | Shank | 74/713 |
| 3,966,020 | 6/1976 | Quick | 74/467 |
| 4,041,804 | 8/1977 | Clark | 74/711 |
| 4,084,450 | 4/1978 | Conroy | 74/713 |

FOREIGN PATENT DOCUMENTS

| | | | |
|---|---|---|---|
| 456425 | 5/1949 | Canada | 74/674 |
| 1255510 | 11/1967 | Fed. Rep. of Germany | 74/424 |
| 641100 | 7/1928 | France | 74/423 |
| 632927 | 2/1962 | Italy | 74/710 |

Primary Examiner—Leslie Braun
Attorney, Agent, or Firm—Wegner, Stellman, McCord, Wiles & Wood

[57] ABSTRACT

A differential gear assembly (10) wherein the tooth face loading is utilized to maintain the driven idler gear (17) in a preselected disposition without the need for a thrust washer. The positioning of the idler gear is controlled by the use of a single tapered roller bearing assembly (18) which serves as a thrust absorbing structure. The driver gear is maintained against the roller (28) of the roller bearing by the toothed loading during operation of the differential gear assembly and by a spring (30) at all other times. One race (25) of the single tapered roller bearing assembly (18) may be formed integrally with the bevel gear and, more specifically, may be defined by a surface portion of the bevel gear. The pressure angle, pitch angle and bearing K factor are preselected so that the bearing induced thrust load, due to the radial load developed thereon by the bevel gear, is less than the thrust generated between the meshing gear teeth.

9 Claims, 1 Drawing Figure

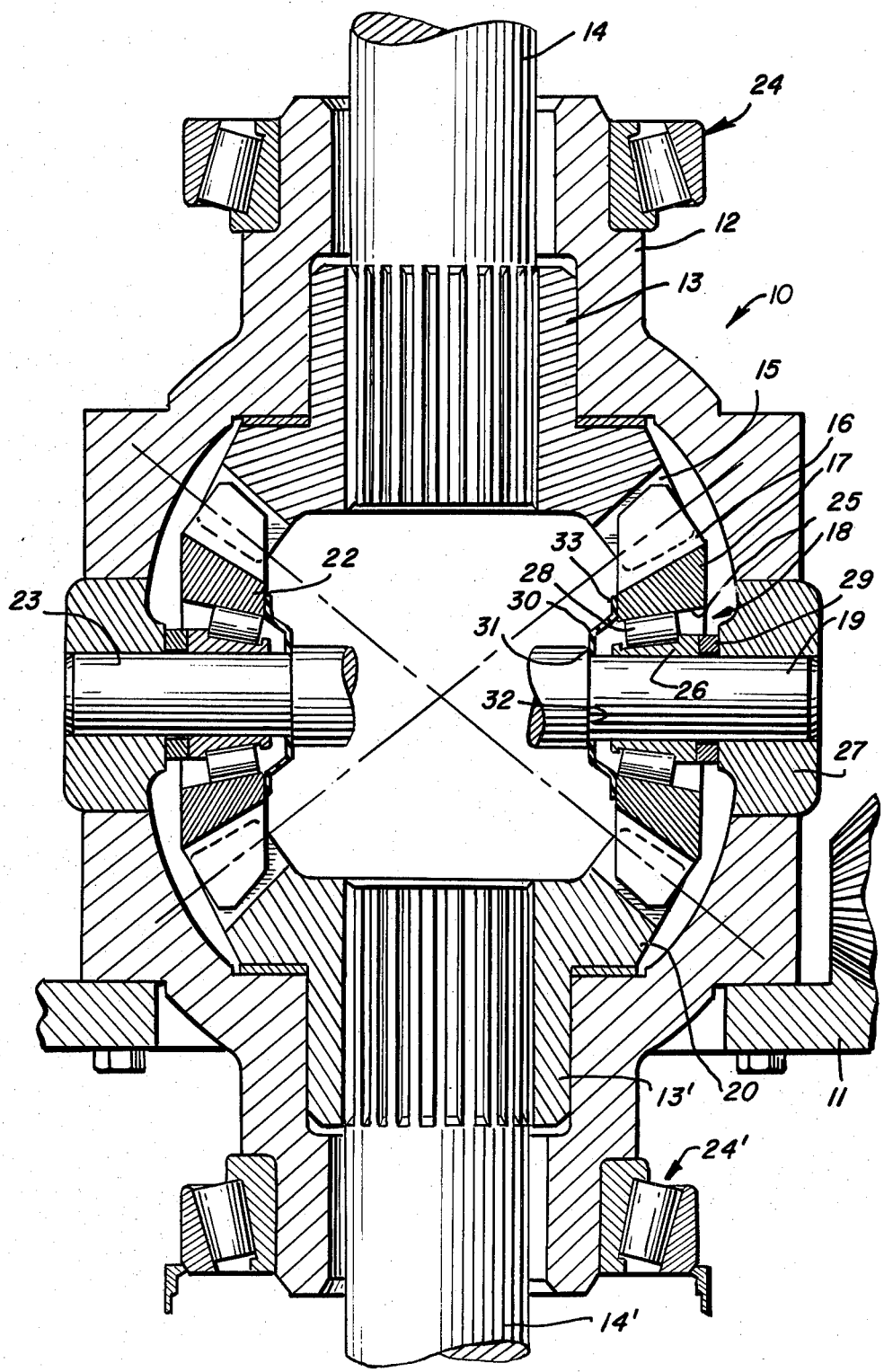

DIFFERENTIAL GEAR POSITIONING MEANS

DESCRIPTION

Technical Field

This invention relates to differential gear assemblies and in particular to means for positioning a bevel gear of such an assembly.

Background Art

In the conventional differential gear assembly, bevel gears are provided with the meshing teeth thereof transferring load forces in such a manner as to cause the driven gear to have an axial thrust.

It has been conventional to provide thrust washers to accommodate the axial thrust of the driven gear. In one form, the thrust washer comprised a dished washer disposed between the gear and the housing. A problem has arisen in such assemblies as a result of a failure of the thrust washer.

DISCLOSURE OF THE INVENTION

In one aspect, the present invention comprehends an improved differential gear assembly having a novel means for positioning the bevel gears thereof so as to avoid the necessity for use of the conventional thrust washer for absorbing thrust loads imposed by the mating bevel gears.

More specifically, the invention comprehends such a differential gear assembly wherein the thrust absorbing means comprises a tapered roller bearing assembly.

The bevel gear journalled by the roller bearing assembly is maintained in contact with the bearing by the load imposed by the meshed gear teeth.

In the illustrated embodiment, one race of the roller bearing assembly is defined by a surface portion of one of the gears.

The pressure angle, pitch angle and bearing arrangement are preselected so that the bearing thrust developed by the radial load thereon is less than the thrust generated by the meshing gear teeth.

In the illustrated embodiment, biasing means are provided for biasing the gear carried by the roller bearing to maintain contact between the bevel gear and the bearing when the gearing assembly is unloaded.

In the illustrated embodiment, the biasing means may comprise a finger spring.

The spring may act directly between a portion of the shaft on which the bevel gear journaled by the bearing means is mounted and a portion of that bevel gear.

In the illustrated embodiment, the spring acts against the portion of the bevel gear defining a race for the bearing.

Thus, the differential gear assembly of the present invention is extremely simple and economical of construction while yet providing the highly desirable features discussed above.

BRIEF DESCRIPTION OF THE DRAWING

The FIGURE is a transverse section illustrating a differential gear assembly embodying the invention.

BEST MODE FOR CARRYING OUT THE INVENTION

In the exemplary embodiment of the invention as disclosed in the drawing, a differential gear assembly generally designated 10 is shown to include an input ring gear 11 secured to a housing 12. Housing 12 encloses a pair of bevel gears 13 and 13' which are splined to output shafts 14 and 14'. The teeth 15 of the gears 13 and 13' mesh with teeth 16 of a driven bevel gear 17 rotatably carried by means of a roller bearing assembly generally designated 18 on a stub shaft 19 carried in the housing 12.

Gear 17 effectively defines an idler gear and, in turn, meshes with bevel gear 13' splined to output shaft 14' as indicated above.

As shown in the drawing, a second driven bevel idler gear 22 is arranged to mesh with bevel gear 13 and is rotatably carried on a second stub shaft 23. The idler gear 22, in turn, meshes with bevel gear 13' on shaft 14'.

The housing 12 may be rotatably carried by means of roller bearings 24 and 24'.

The invention is concerned with the mounting of the idler gears 17 and 22 so as to eliminate the use of thrust washers as conventionally utilized in locating the idler gears. As indicated above, the use of such thrust washers has raised a problem in the prior art structures because of failure thereof.

More specifically, the present invention comprehends the provision of means for absorbing the thrust load on the idler gear resulting from the meshed engagement of the idler gear teeth 15 and 16 in the operation of the differential. Thus, more specifically, the thrust load imposed by the engaged teeth acts axially to the right, as seen in the drawing, urging the bevel gear against the rollers 28 of the bearing assembly 18. The thrust component is absorbed by the race 26, in turn acting through a spacer 29 against the wall member 27.

Thus, the gear 17 is maintained in contact with bearing assembly 18 by the driving load during operation of the differential.

Gear 17 may be biased against the bearing rollers 28 by a dish-type finger spring 30 having an annular mounting portion 31 carried on the stub shaft 19 against an annular shoulder 32 thereof. The outer portion 33 of the finger spring engages the bevel gear 17 to urge it axially to the right, as seen in the drawing. Thus, the gear 17 is at all times biased against the bearing assembly 18 either by the spring 30 alone or by the cumulative action of the spring and gear tooth face loading.

The utilizing of the pressure angle of the tooth contact between the bearings 14 and 17 eliminate the need for the conventional thrust bearing.

The housing 12 may comprise a conventional split case housing for facilitated assembly.

The pressure angle of the meshing bevel gear teeth, the peak angle thereof and the cone angle of the bearing assembly 18 are preselected so that the bearing thrust, due to the radial loading of the gear 17 thereon, is less than the thrust generated by the meshing gear teeth.

In one illustrative embodiment, the idler gear comprises a 10-tooth gear with a pitch apex to midface of 2.7 and an F factor of 0.80. The bearing has a K factor of 2.2.

INDUSTRIAL APPLICABILITY

The improved differential structure may be utilized in a wide range of drive applications.

Thus, the differential is adapted for use in tractors and the like wherein it is highly desirable to avoid the maintenance problems attendant the use of the conventional thrust washers as has been common in the prior art. The present invention provides a low cost, low maintenance solution to this vexatious problem.

Further, the improved differential configuration eliminates scoring between the gear and shaft as the gear is rolling on the bearing and not contacting the shaft.

Other aspects, objects and advantages of this invention can be obtained from a study of the drawing, the disclosure and the appended claims. The foregoing disclosure of specific embodiments is illustrative of the broad inventive concepts comprehended by the invention.

I claim:

1. A differential gear assembly (10) comprising:
a driver bevel gear (13);
a driven bevel gear (17) meshing with said driver bevel gear and defining therewith an acute tooth contact pressure angle relative to the axis of rotation of the driven bevel gear;
a shaft (19) coaxial of said axis;
a plurality of tapered roller bearings (28) rotatively supporting said driven bevel gear coaxially on said shaft, said roller bearings being disposed at an angle to said shaft axis coordinated with the pressure and pitch angles of said meshing bevel gears such that the axial thrust of said roller bearings on said shaft is less than the thrust parallel to said shaft axis developed by the meshing level gears; and
spring biasing means acting between said driven bevel gear and said shaft for maintaining said driven gear in contact with said tapered roller bearings in the absence of driving force from said driver gear acting on said driven gear.

2. The differential gear assembly (10) of claim 1 wherein one race (25) for said roller bearings comprises a surface portion of said driven bevel gear (17).

3. The differential gear assembly (10) of claim 1 wherein said driven bevel gear (17) is supported solely by said tapered roller bearings (18).

4. A differential gear assembly (10) comprising:
a driver bevel gear (13);
a driven bevel gear (17) meshing with said driver bevel gear and defining therewith an acute tooth contact pressure angle relative to the axis of rotation of the driven bevel gear;
a shaft (19) coaxial of said axis;
a plurality of tapered roller bearings (28) rotatively supporting said driven bevel gear coaxially on said shaft, said roller bearings being disposed at an angle to said shaft axis coordinated with the pressure and pitch angles of said meshing bevel gears such that the axial thrust of said tapered roller bearings on said shaft is less than the thrust parallel to said shaft axis developed by the meshing bevel gears; and
spring biasing means (30) acting between said shaft and said driven bevel gear for biasing said driven bevel gear (17) against said tapered roller bearings to retain said tapered bearings in assembled relationship on said shaft as during assembly of the differential gear assembly.

5. The differential gear assembly (10) of claim 4 wherein said biasing means (30) comprises a spring having an annular portion carried by said shaft (19) and spring fingers extending outwardly from said annular portion into engagement with said driven bevel gear.

6. The differential gear assembly (10) of claim 5 wherein said shaft (19) is provided with an annular shoulder and said annular portion of the spring seats against said shoulder.

7. The differential gear assembly (10) of claim 4 wherein said biasing means (30) comprises a dished washer spring carried by said shaft (19).

8. The differential gear assembly (10) of claim 4 wherein a portion of said driven bevel gear (17) defines a race (25) for the roller bearings and said biasing means (30) acts against said portion.

9. The differential gear assembly (10) of claim 4 wherein a portion of said driven bevel gear (17) defines a race (25) for the roller bearings and said biasing means (30) comprises a finger spring acting against said portion.

* * * * *